G. CLAUDE & R. J. LÉVY.
PROCESS FOR THE SEPARATION OF GASEOUS MIXTURES INTO THEIR ELEMENTS.
APPLICATION FILED JUNE 3, 1904.
967,105.
Patented Aug. 9, 1910.
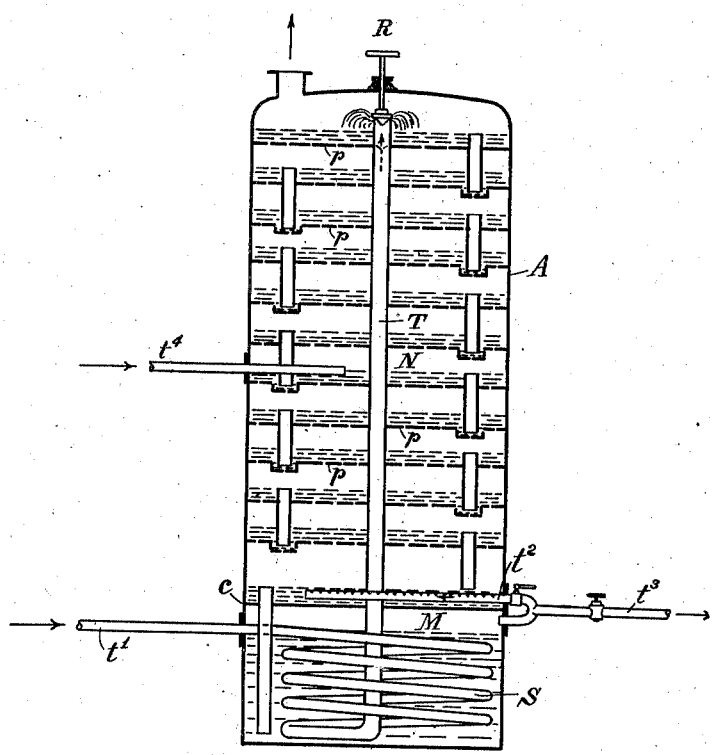

UNITED STATES PATENT OFFICE.

GEORGES CLAUDE, OF NOGENT-SUR-MARNE, AND RENÉ JACQUES LÉVY, OF BOULOGNE-SUR-SEINE, FRANCE, ASSIGNORS TO SOCIETE L'AIR LIQUIDE (SOCIETE ANONYME POUR L'ETUDE ET L'EXPLOITATION DES PROCEDES GEORGES CLAUDE), OF PARIS, FRANCE.

PROCESS FOR THE SEPARATION OF GASEOUS MIXTURES INTO THEIR ELEMENTS.

967,105.        Specification of Letters Patent.        Patented Aug. 9, 1910.

Application filed June 3, 1904. Serial No. 210,987.

*To all whom it may concern:*

Be it known that we, GEORGES CLAUDE, a citizen of France, and resident of Nogent-sur-Marne, Department of the Seine, France, and RENÉ JACQUES LÉVY, a citizen of France, and resident of Boulogne-sur-Seine, France, have invented an Improved Process for the Separation of Gaseous Mixtures into Their Elements, for which we have obtained Letters Patent of the Republic of France, No. 338,842, dated June 3, 1903, and of which the following is a specification.

Although our invention has a wide application for the separation of gaseous mixtures of every kind and proportion into their elements, we shall describe it more particularly as a new process for the separation of oxygen in any desired degree of purity from atmospheric air by means of evaporation and liquefaction.

This process is based upon the fact ascertained by us that in order to transform liquid air into very pure liquid oxygen by the progressive evaporation of the nitrogen and the simultaneous liquefaction of a corresponding quantity of oxygen, it is sufficient to bring nearly pure cold gaseous oxygen into contact with liquid air in any manner, as for instance by causing the gaseous oxygen to pass in bubbles through the liquid air. By evaporating the liquid oxygen which is obtained we obtain a quantity of gaseous oxygen greater than that used, and if the apparatus is suitably devised, greater than the quantity of oxygen previously contained in the liquid air used, and this entire excess may be furnished by the atmosphere. This evaporation of the oxygen is made use of in our invention. It is effected by forcing cold air under suitable pressure into a tubular vessel or into a coil immersed in liquid oxygen. The evaporation of oxygen will thus cause the condensation of a substantially equivalent quantity of air under pressure, and we thus obtain a quantity of liquid air nearly equal to that at the start which in its turn is separated into pure oxygen by repeating the same operations.

In order to give this method its highest practical value, it is essential that the oxygen gas be utilized as completely as possible; the simple passage in bubbles through the liquid mass would yield poor results, for it is evident that the gas at its outcome from the liquid holding a large quantity of oxygen would itself contain very much oxygen and the loss would be greater than the gain. It is therefore of importance that this passage of the oxygen gas through the liquid air be carried out in a particular manner, for instance, by supplying the liquid air to be converted into oxygen at the upper part of a column provided with baffle plates or other suitable device and by supplying the gaseous oxygen at the lower end of the column, so that the gas travels through the successive chambers and issues from the column at the point of supply of the liquid air.

It is well known that if the liquid air at its formation contains like the atmospheric air about 21 per cent. of oxygen, the gas at its issue contains only about 6 or 7 per cent. of oxygen. If it be necessary to retain these quantities, it is possible to provide the column with an extension at the end of which we feed liquid air containing less than 21 per cent. of oxygen obtained, for instance, in the manner described in the pending application for Letters Patent of the United States No. 187,307, filed December 31st 1903 by Georges Claude one of these applicants. The losses in cold in the column can be compensated for either by the introduction of liquid air obtained from an auxiliary source, or by the expansion of the air to be liquefied, compressed for this object to a higher degree.

The drawing shows a novel apparatus which we have invented to carry our method into effect.

In this figure A is an insulated metallic cylinder carrying in its upper part the perforated plates $p$—$p$, the lower part of which is provided with a partition $c$ forming a chamber M communicating with the upper part N of the cylinder by means of a pipe descending into the lower part. In M is contained a coil S with feed aperture $t'$, and which extends into a tube T provided with a cock R passing into the upper part of the cylinder and ending above the top plate $p$. The gas evaporated in M distributes itself through the pipes $t^2$ and $t^3$ of which the pipe $t^2$ is perforated and is situated below the lower perforated plate of chamber M and the pipe $t^3$ leads to the exterior through interchangers used in this kind of apparatus, through which the vapor circulates in a direction opposite to that of the air or gas to be separated.

It will be noted that during the ascension of the vapor up the part N, the vapors becoming progressively poorer in oxygen, will at a certain height present the composition of the atmospheric air. If at this place atmospheric air is admitted, its oxygen will be utilized under the same conditions as that of the vapors, and the oxygen thus freely obtained from the atmosphere increases the quantity of oxygen obtained and thus increases the economic value of the process; the more so because it is not necessary to compress such air and it will be sufficient to cool the same in an interchanger by means of the counter current of some of the cold gas emanating from the apparatus. It is to be remarked that by this introduction of air into the apparatus the conditions of the process are modified, and in the apparatus described I find the most advantageous point of admission $t^4$ to be between the fifth and sixth perforated plates counting from the bottom upward.

To start the apparatus a quantity of liquid air sufficient to cover the coils S of the chamber M is introduced, then gaseous air is introduced into the coil S having in relation to the exterior liquid a sufficient excess of pressure to bring about its liquefaction. The product of this liquefaction is passed to the top of the apparatus through T, the flow being regulated by the cock R. The liquid runs downward from plate to plate in a direction opposite to the gaseous flow which starts from a part of the products of the evaporation in M emanating through $t^2$ in the lower part of N; the balance of the products of evaporation passes out through $t^3$, and circulates in a direction opposite to that of the air or gas to be separated. The liquid flowing downward in the apparatus becomes progressively richer in oxygen and finally only pure oxygen evaporates in M, of which the part not utilized in the cylinder is collected at the exterior and is utilized.

It is, of course, necessary in practice to regulate very precisely the counter pressures of the interchangers through which the different gases travel so as to obtain the complete equality of pressure in M and N, which is necessary in order to cause the liquid to flow readily from N into M. In the liquid air or liquid mixtures of oxygen and nitrogen we thus increase progressively the quantity of oxygen contained therein by the substitution of the nitrogen of the liquid by the gaseous oxygen, the liquid oxygen thus obtained being in turn evaporated in liquefying another portion of air or of the mixtures to be separated.

We may employ the foregoing process and apparatus for the separation of mixed gases other than oxygen and nitrogen into their elements and we do not confine our claims to the separation of atmospheric air or to the separation of any particular mixture of gases into their elements.

What we claim and desire to secure by Letters Patent of the United States is:—

1. A process for separating atmospheric air into its constituents, which consists in compressing, cooling, and liquefying the air, subjecting the liquefied part or parts to rectification, collecting in a single compartment the liquid oxygen or liquid rich in oxygen resulting from the rectification, completely vaporizing in this single compartment the aforesaid liquid by circulating the whole of the cold compressed air in indirect contact with it, causing the liquid resulting from the aforesaid circulation and consequent liquefaction of the cold compressed air to descend through a rectifier into the aforesaid single compartment, effecting a direct withdrawal from above the surface of the liquid therein of a portion of the vapors rising from said liquid, and conducting the remainder only of the vapors in the opposite direction to and in contact with the descending liquid to progressively enrich it in oxygen by the substitution of the oxygen of the vapors for the nitrogen of the liquid, no liquid being withdrawn from the single compartment.

2. A process for separating atmospheric air into its constituents which consists in passing cold compressed air through but not in direct contact with the liquid oxygen or liquid rich in oxygen which results from the separation and is thereby vaporized, causing the liquid resulting from the said liquefying of the cold compressed air to flow downward in the opposite direction to and in contact with the vapors ascending from the liquid oxygen or liquid rich in oxygen, and adding cold gaseous air to the ascending vapors at a point where they are of approximately atmospheric composition.

3. A process for separating atmospheric air into its constituents, which consists in liquefying cold compressed air in a vaporizing compartment containing the liquid oxygen or liquid rich in oxygen which results from the separation, and is thereby vaporized, causing the liquid resulting from the said liquefying of the cold compressed air to descend by stages into the said vaporizing compartment, conducting part of the vapors ascending therefrom in the opposite direction to and in contact with the descending liquid to progressively enrich it in oxygen by the substitution of the oxygen of the vapors for the nitrogen of the liquid, and adding cold gaseous air to the ascending vapors at a point where they are of approximately atmospheric composition.

4. A process for separating atmospheric air into its constituents, which consists in liquefying cold compressed air in a vaporizing compartment containing the liquid oxygen or liquid rich in oxygen which results from the separation, and is thereby vaporized, causing the liquid resulting from the said liquefying of the cold compressed air to descend by stages into the said vaporizing compartment, conducting part of the vapors ascending therefrom in the opposite direction to and in contact with the descending liquid to progressively enrich it in oxygen by the substitution of the oxygen of the vapors for the nitrogen of the liquid, and adding a cold gaseous mixture of oxygen and nitrogen, poorer in oxygen than the vapors immediately above the liquid in the vaporizing compartment, to the ascending vapors, at a point where they are of approximately the same composition as the aforesaid gaseous mixture, and at a pressure only sufficient to enable it to ascend, together with the aforesaid vapors, through the descending liquid.

In witness whereof, we have hereunto set our hands at Paris, France, this twenty-first day of May 1904.

GEORGES CLAUDE.
RENÉ JACQUES LÉVY.

In presence of—
HANSON C. COXE,
CHARLES CHAPUIS.